United States Patent [19]
Nakagawa

[11] Patent Number: 5,373,882
[45] Date of Patent: Dec. 20, 1994

[54] PNEUMATIC TIRES

[75] Inventor: Masao Nakagawa, Kokubunji, Japan

[73] Assignee: Bridgestone Corporation, Tokyo, Japan

[21] Appl. No.: 25,615

[22] Filed: Mar. 3, 1993

[30] Foreign Application Priority Data

Mar. 16, 1992 [JP] Japan .................. 4-058476

[51] Int. Cl.⁵ .............................. B60C 11/11
[52] U.S. Cl. ................................ 152/209 R
[58] Field of Search .......... 152/209 R, 209 D, 209 A; D12/144, 146, 147

[56] References Cited

U.S. PATENT DOCUMENTS

| D. 299,711 | 2/1989 | Wallet .................. D12/147 |
| D. 334,369 | 3/1993 | Christenbury ........... D12/147 |
| 4,299,264 | 11/1981 | Williams ............... 152/209 R |
| 4,462,446 | 7/1984 | Goergen et al. ......... 152/209 R |
| 4,619,300 | 10/1986 | Tokunaga et al. . |
| 4,676,290 | 6/1987 | Tansei et al. .......... 152/209 R |
| 5,158,626 | 10/1992 | Himuro ................. 152/209 R |

FOREIGN PATENT DOCUMENTS

| 0325552 | 7/1989 | European Pat. Off. . |
| 3912358 | 11/1989 | Germany . |
| 4112046 | 10/1991 | Germany . |
| 0169305 | 9/1985 | Japan .................. 152/209 D |
| 3121912 | 5/1991 | Japan .................. 152/209 D |
| 3136909 | 6/1991 | Japan .................. 152/209 R |
| 3157208 | 7/1991 | Japan .................. 152/209 R |
| 3271006 | 12/1991 | Japan .................. 152/209 B |
| 4019202 | 1/1992 | Japan .................. 152/209 D |
| 1594884 | 8/1981 | United Kingdom ........ 152/209 R |

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

A pneumatic tire has a specified running direction, and comprises a pair of sidewalls, a tread provided with at least one circumferential groove extending in parallel to an equatorial plane of the tire, a plurality of lug grooves intersecting this at least one circumferential groove, and land portions defined by the at least one circumferential groove and the lug grooves intersecting the former groove. Axially narrow portions and axially wide portions are periodically formed for the above at least one circumferential groove by axially waving at least one of opposite sidewalls of at least one circumferential grooves in an axial direction. Each of the lug grooves is combined with or meets the at least one circumferential groove at an area located between an axially most narrowed portion of the circumferential groove and an axially most widened portion of the circumferential groove which is to contact a road prior to the axially narrowed portion during a forward running.

12 Claims, 4 Drawing Sheets

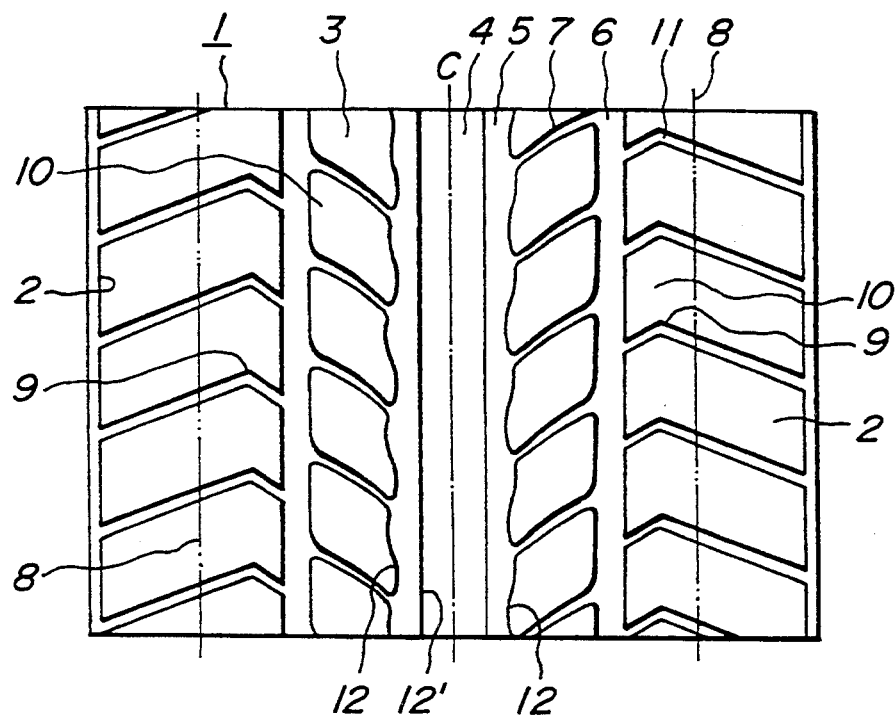
FIG_1
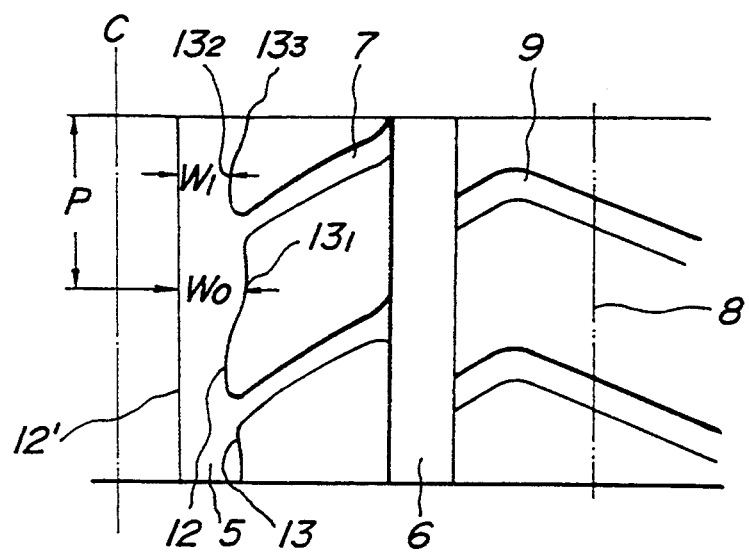
FIG_2

FIG._4a
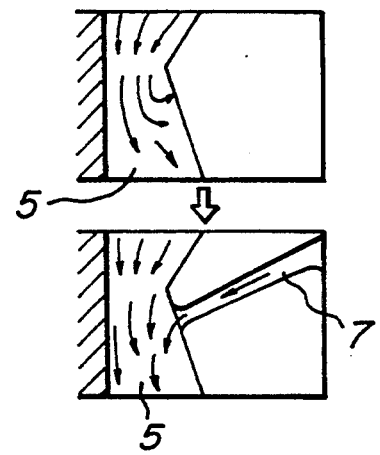
FIG._4b
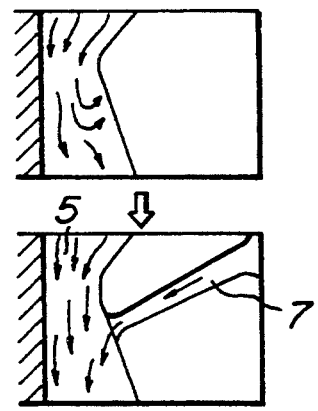
FIG._4c
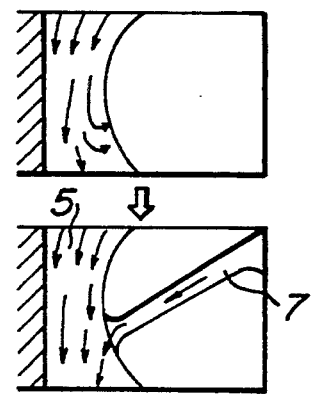

PNEUMATIC TIRES

(1) Field of the Invention

The present invention relates to pneumatic tires provided with tread patterns which realize both reduction in noise of the tires and an improvement on wet hydroplaning resistance.

(2) Related Art Statement

In tires having their forward-backward rotating directions specified, for example, herringbone-shaped treads are known. These tires have a pair of circumferential straight grooves are provided in a central portion of the tread through an equatorial plane of the tire, intermediate circumferential straight grooves are provided between these central circumferential grooves and opposite edges of the tread, respectively, a number of inclined lug grooves are extended from the opposite ends of the tread to the central circumferential straight grooves in such a direction that the corresponding inclined lug grooves might be converged in the center of the tread, and land portions are defined by the above various grooves. In this case, the inclined lug grooves connecting the central circumferential grooves and the intermediate circumferential grooves have substantially the same width and substantially the same depth at any location over in the longitudinal direction thereof. However, this known tread pattern mentioned above has the following problems.

That is, in the above tread, the width of each of a kicking-in portion and a kicking-out portion of the circumferential straight groove within a road-contacting surface rapidly increases during running as compared with the other central portion of the road-contacting surface. Following this, high frequency vibration occurs in the sidewalls of the groove, so that this vibration causes a resonating action upon air inside the circumferential main groove as a resonator within the road-contacting surface. Consequently, noise level increases.

Under the circumstances, as a countermeasure to reduce worsened noise, such tire is imparted with an acoustic filter principle, i.e., a silencer effect is afforded to the tire by repeatedly narrowing and widening the circumferential main groove through throttling, while the volume of the circumferential main groove is kept constant.

However, when wet performance is considered, the circumferential straight groove must permit the flow of water as a medium inside the groove within the road-contacting surface, in a rearward direction, that is, in a rotating direction of the tire. In this case, no disturbance occurs on a forward side of the throttled portion with respect to the flowing water unless the groove is rapidly throttled. However, since the groove is widened on the rearward side of the throttled portion, vortex motion occurs owing to separation of water from the sidewalls of the groove and drainage performance is deteriorated irrespective of the throttling degree. In other words, the wet performance is unfavorably degraded in favor of the noise countermeasure.

SUMMARY OF THE INVENTION

The present invention has been accomplished to solve the above problems possessed by the prior art, and provides a pneumatic tire in which reduction in noise of the tire and improvement on wet performance are both realized by employing a special tread structure. The width of the circumferential groove in the conventional herringbone-shaped tread is periodically widened and narrowed, and lug grooves intersecting the circumferential grooves are combined with or meet the circumferential groove at locations each positioned between a narrowed groove portion and a widened groove portion adjacent thereto which is to contact the road prior to the narrowed groove portion during forward running.

In order to solve the above object, the present invention provides a pneumatic tire having a specified running direction, comprising a pair of sidewalls, and a tread toroidally spread over between both the sidewalls and adapted to contact a road surface, said tread being provided with at least one circumferential groove extending in parallel to an equatorial plane of the tire, a plurality of lug grooves intersecting said at least one circumferential groove, and land portions defined by the at least one circumferential groove and said lug grooves intersecting the former groove. The axially narrow portions and axially wide portions are periodically formed for said at least one circumferential groove by waving at least one of the opposite side walls of at least one circumferential groove in an axial direction. Each of the lug grooves is combined with or meet at least one circumferential groove at an area located between an axially most narrowed portion of the circumferential groove and an axially most widened portion of the circumferential groove which is to contact the road prior to said axially most narrowed portion during forward running.

The function of the above-constituted pneumatic tire according to the present invention will be described below.

That is, since the widened portions and the narrowed portions are periodically formed in the circumferential groove of the herringbone-shaped tread in the circumferential direction by axially waving at least one of the sidewalls of the circumferential groove, noise occurring due to vibration of air inside the circumferential groove within the road-contacting plane during the tire running can be reduced.

On the other hand, the lug grooves each communicate with an area of the circumferential groove located from the corresponding most narrowed portion to the adjacent most widened portion contacting the road prior to the above most narrowed portion in the circumferential groove repeatedly narrowed and widened by axially waving the sidewall of the groove. That is, the lug grooves each communicate with the circumferential groove toward a direction of a separation point, i.e., a location where vortex motion occurs in an axially widened area of a water-diffusing zone, behind the throttled portion of the circumferential groove. Thus, fluid can smoothly flow through the circumferential groove and the lug grooves when the tread contacts the road, so that wet performance can be maintained.

The following are preferred criteria for the pneumatic tire according to the present invention.

(1) A pair of shoulder-circumferential grooves are provided on the tread, a number of shoulder-lug grooves are provided on the tread near opposite edges thereof, the shoulder-lug grooves being each bent in a reversely dog-leg form and extending between each of edges of the tread and the shoulder-circumferential groove, and the central lugs are circumferentially staggered from the shoulder-lug grooves in phase. This is preferable to further reduce the tire noise.

(2) At least one of the sidewalls of the central circumferential groove is axially waved in a sinusoidally curved form or in a polygonally curved form. This is preferable for affording a silencing effect upon the central circumferential groove to further reduce the tire noise.

(3) A vertex of a ridge is located inside a pitch area defined between adjacent valleys of said at least one of the sidewalls of the central circumferential groove, provided that a portion falling 20% of the pitch area as measured from each of the valley and the adjacent valley is excluded. This prevents the shape of the narrowed portion from rapidly changing.

(4) Each of the lug grooves is combined with such a portion of the central circumferential groove on the sinusoidal curved sidewall that a tangential line drawn at this portion of the central circumferential groove between the valley and the vertex of the ridge succeedingly contacting the road forms an angle of 4° to 30° between the equatorial plane C. This effectively eliminates vortex occurring in the widened portion.

(5) The width of the central lug groove is widest at a location where the central lug groove is combined with the shoulder-circumferential groove, and though not shown in a sectional view, the depth of the central lug groove is smaller than that of the shoulder-circumferential groove. This enhances rigidity of the blocks corresponding to the wide portions of the central legs.

(6) The pneumatic tire of the invention has a width of the central lug groove that gradually decreases toward the central circumferential and has a depth of the central lug groove which increases to compensate for reduction in the width thereof. The depth of the central lug groove becomes substantially equal to that of the central circumferential groove at the location where the former is combined with the latter. This contributes to reduced tire noise and improved wet performance.

(7) The pneumatic tire of the invention has an axially inner side of a central circumferential groove that is shaped in a sinusoidal form. The same effect as in above (3) can be obtained.

(8) The pneumatic tire of the invention has the ratio of $W_1/W_0$ in which $W_0$ and $W_1$ are widths of the circumferential groove at the valley and a vertex of a ridge, respectively, is 0.2 to 0.9, preferably 0.3 to 0.8. The same effects as in above (3) and (4) can be obtained.

These and other objects, features and advantages of the invention will be appreciated upon reading of the following description of the invention when taken in conjunction with the attached drawings, with the understanding that the invention could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 1 is a view illustrating a tread pattern as one embodiment of the pneumatic tire according to the present invention;

FIG. 2 is a enlarged view of a part of the tread pattern of the pneumatic tire of FIG. 1;

FIGS. 4(a) through 4(c) are views illustrating the flow state with respect to various cases where a circumferential groove is repeatedly provided with axially widened portions and axially narrowed portions and their modified cases where lug grooves are combined with the circumferential groove.

DETAILED DESCRIPTION OF THE INVENTION

Figure 3:
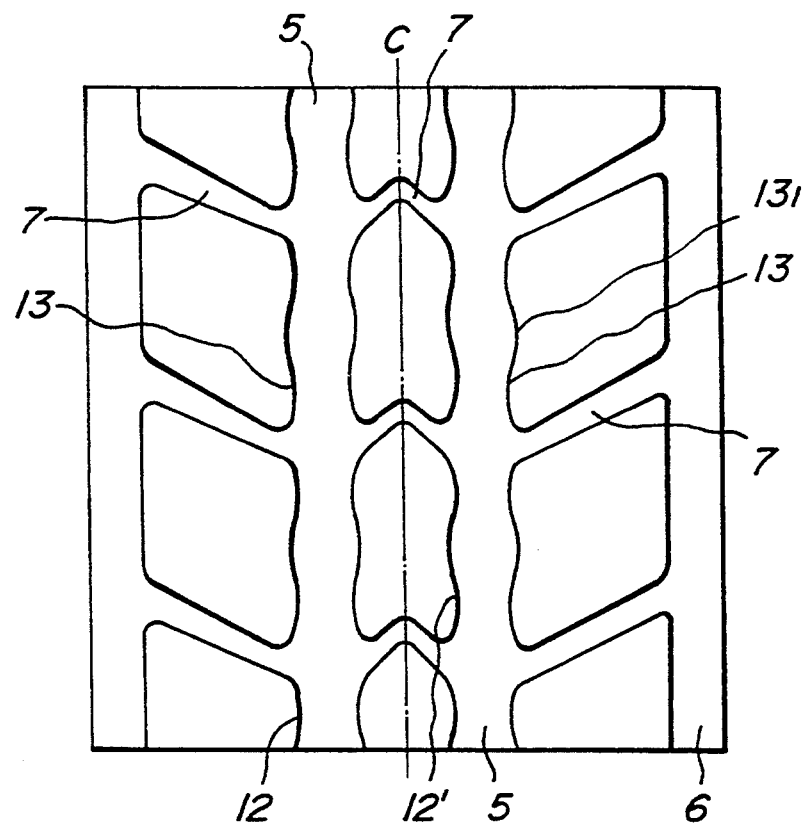
FIG. 3 is a view of a modified embodiment of the circumferential groove in FIG. 2.

Embodiments of the present invention will be explained with reference to the attached drawings.

In FIG. 1, a crown portion 3 toroidally extends between a pair of sidewalls 2, and is connected to both the sidewalls. A tread 1 is formed on a radially outer peripheral side of the crown portion 3. A number of land portions in the form of lugs 10 are positioned in the crown portion 3. The tread 1 is provided with a rib 4 in a central portion. The central circumferential grooves 5 and shoulder-circumferential grooves 6 are provided on the tread on axially outer sides of the rib 4 and symmetrically with respect to an equatorial plane C of the tire. The shoulder-circumferential grooves 6 are located near opposite edges 8 of the tread, and extend in a substantially straight fashion. A number of center lug grooves 7 are arranged between the central circumferential groove 5 and the shoulder-circumferential groove 6, while being spaced in the circumferential direction at a given internal. The center lug grooves 7 on the axially right and left sides form a pair such that the corresponding right and left lug groove might meet together at the equational plane C. A number of shoulder lug grooves 9 are provided between the shoulder-circumferential groove 6 and each of edges of the tread. Grooves on rightmost and leftmost sides are nibbling grooves. The phase of the lug grooves 7 and that of the shoulder grooves 9 are made different from each other in the circumferential direction, and the lug grooves 9 form dog-leg-like shapes 11. The tread 1 having such a lug-groove arrangement pattern contacts the road from a lower side of FIG. 1 as viewed in the forward rotating direction, and the upper portion of the tread in FIG. 1 contacts the road with a time lag. Such a tread is called as a uni-directional tread. A sidewall 12 on the axially outer side of the center circumferential groove is axially waved. As shown in FIG. 2, the sidewall 12 is waved substantially in the from of a sinusoidal curve (The term "sinusoidal" including a wavy form) in the circumferential direction. As a matter of course, the shape of the sidewall may be polygonal. By this construction, width-decreased (narrowed) portions and width-increased (widened) portions are alternatively formed in the circumferential direction for the central circumferential groove. In this embodiment, the other sidewall 12' is made straight. In an enlarged view of FIG. 2, each of the inclined central lug grooves 7 is combined with or meets a portion of the central circumferential groove 5 falling within a pitch area P defined as a circumferential length between a valley $13_1$ of the sinusoidally curved sidewall 12 of the central circumferential groove 5 and a next valley $13_3$ adjacent thereto. In this case, it is preferable that the vertex $13_2$ of a ridge is located inside the pitch area P excluding the portion falling within 20% of the pitch area P as measured from each of the valley $13_1$ and the adjacent valley $13_3$. That is, this vertex is preferably located in a central portion inside the pitch area P corresponding to 60% of the pitch area P. It is necessary that the inclined center lug groove 7 is combined with or meets a portion of the central circumferential groove 5 between the valley $13_1$ first contacting the road during forward running and the vertex $13_2$ (the narrowest width portion of the groove) of the ridge then contacting the road. Furthermore, it is further preferable that the lug groove 7 is combined with such a portion of the central circumferential groove so that a tangential line drawn at this portion of the central circumferential groove onto the sinusoidal line of the groove wall between the valley $13_1$ and the vertex $13_2$ of the ridge succeedingly contacting the road forms an angle of 4° to 30° between the equatorial plane C.

In FIG. 2, the width of the central lug groove 7 is widest at a location where the lug groove 7 is combined with the shoulder-circumferential groove 6. While though not shown in a sectional view, the depth of the central lug groove 7 is smaller than that of the shoulder-circumferential groove 6.

On the other hand, while the width of the lug groove gradually decreases as the lug groove goes toward the central circumferential groove 5, the depth of the lug groove 7 increases to compensate reduction in the width thereof. The depth of the lug groove 7 becomes substantially equal to that of the central circumferential groove 5 at the location where the former is combined with the latter.

FIG. 3 shows an embodiment of the pneumatic tire according to the present invention, in which an axially inner side of a central circumferential groove 5 is similarly shaped in a sinusoidal form. Widened and narrowed portions of the central circumferential groove 5 are formed by the opposite sidewalls thereof, and similar effects as obtained by a silencer can be expected. Thus, when a tire of this type is selected depending upon a normal rpm of the tire, etc., noise of the tire can be remarkably reduced if the tire rotates at such a normal rpm. The ratio of $W_1/W_0$ in which $W_0$ and $W_1$ are the groove widths at the valley $13_1$ and the vertex $13_2$ of the ridge, respectively, is preferably 0.2 to 0.9, more preferably 0.3 to 0.8.

According to the embodiments illustrated in FIGS. 1, 2 and 3, the noise generated due to vibration of air inside the central circumferential groove 5 within the road-contacting area during rotation of the tire can be reduced by affording the silencing effect upon the tire through the structure in which the groove is repeatedly narrowed and widened.

On the other hand, according to the embodiments in FIGS. 1, 2 and 3, the sidewall 12 of the central circumferential groove 5 (also the sidewall 12' in FIG. 3) has the sinusoidally curved shape 13, and each of the center lug grooves 7 is combined with the central circumferential groove 5 at the location of the curved face 13 on the side of the valley $13_1$ with reference to the vertex $13_2$. Thus, although there may be slight differences between the embodiments in FIGS. 1 and 2 and FIG. 3, the fluid flow is as shown in FIG. 4(c), so that no swirl is formed, and good wet performance can be maintained by smoothing flow of the fluid.

Furthermore, according to the embodiments of the present invention, the shoulder lug grooves 9 are designed in an inversely V-shaped form 11. The noise generated in the shoulder lug groove 9 can be reduced by bending the lug groove 9 in the inversely V-shaped form 11, while the wet hydroplaning resistance can be also realized. Instead of the lug grooves 9 being bent in the inversely dog-leg form, the lug groove 9 may be provided with a throttled portion or a projection may be formed at the bottom of the lug groove 9.

Figure 5:
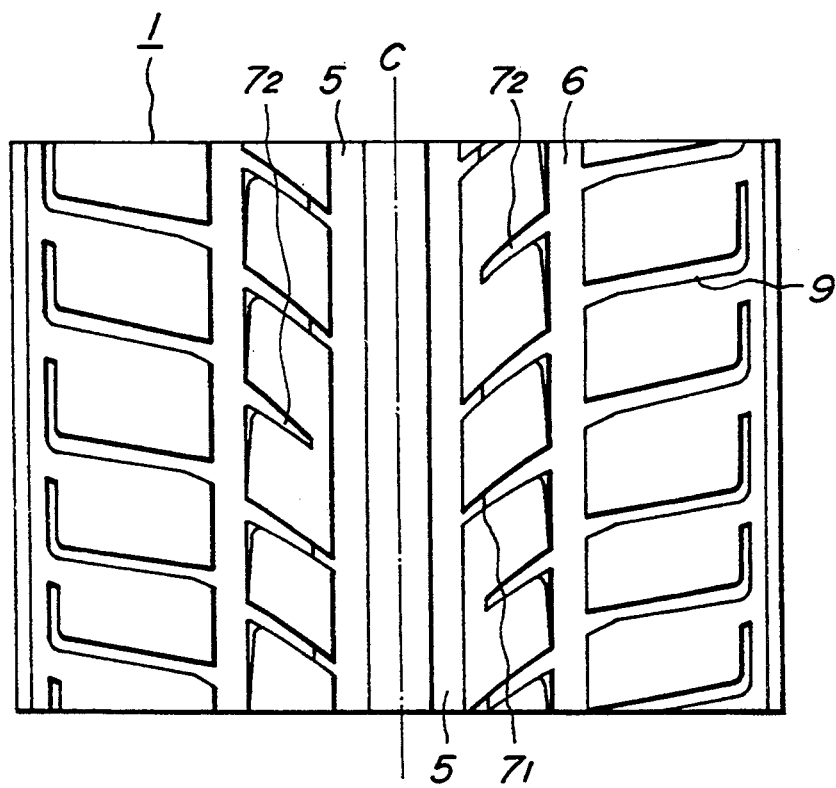
FIG. 5 is a view illustrating a comparative tread pattern.

FIG. 5 is a view illustrating a tread pattern of a conventional pneumatic tire as a comparative example. The tread pattern 1 is formed with central circumferential grooves 5 and shoulder-circumferential grooves 6 both extending in the circumferential direction. The tread pattern is also formed with inclined lug grooves $7_1$ communicating both the grooves 5 and 6 and inclined lug grooves $7_2$ extending toward the equatorial plane C of the tire from the shoulder-circumferential groove 6. The inclined lug grooves $7_1$ and $7_2$ become narrower as the grooves $7_1$ and $7_2$ are defined toward the central circumferential groove 5. The inclined lug grooves $7_2$ also become narrower as the grooves $7_2$ are defined toward the equatorial plane C of the tire from the shoulder-circumferential groove 6. On the other hand, a number of shoulder lug grooves 9 are upwardly inclined from the shoulder-circumferential groove 6, and then extend in the circumferential direction, while the shoulder lug grooves 9 are gradually narrowed. Such shoulder lug grooves 9 are spaced from adjacent ones in the circumferential direction.

A tread pattern according to the present invention as shown in FIG. 1 or a tread pattern as shown in Comparative Example as mentioned above was applied to a pneumatic test tire, which was subjected to a indoor drum test for the tire noise [Automobile Standard Tire Noise Test Method JASO C 606).

(1) Tire size, dimension, etc., of pneumatic test tires:
Tire size: 205/55ZR16,
Rim size: 6JJ
Tire structure:
Carcass . . . two polyester-cord plies
Belt structure . . . two steel-cord plies
Cap: formed by winding nylon cords at two turns
In Example tire, each of the sidewalls of the central circumferential groove was waved by 63 pitches.

(2) Testing method, etc.
While each of the above pneumatic test tires was held at an internal pressure of 2.55 kg/cm², the tire was run with a load of 330 kg on the indoor drum for one tire accord to the Automobile Standard Tire Noise Test Method JASO C606.

(3) Test Results:

| ① Effects afforded upon a peak value in a zone of 1 kHz: | | |
|---|---|---|
| | Test speed | |
| | 40 km/h | 60 km/h |
| Comparative Example (FIG. 5) | 65.8 dB | 70.9 dB |
| Example (FIG. 1) | 59.7 dB | 64.0 dB |
| Reduced amount of noise | 6.1 dB | 6.9 dB |

② Wet performance:
According to the experimental results with respect to the Comparative Example and the Example of the invention, the combination of the center lug grooves with the respective widened portions of the center circumferential groove in the Example of the invention had the occurring degree of vortex and separation suppressed to the same level as that of the Comparative Example in which the central lug grooves are combined with the straight circumferential groove, while the hydroplaning resistance was not deteriorated.

As detailed above, since the pneumatic tire according to the present invention is constituted such that at least one sidewall of the circumferential groove is axially waved to periodically form the widened portions and the narrowed portions in the circumferential direction and further the lug grooves are combined with the circumferential groove at the area located between the axially most narrowed portion and the axially most widened portion of the circumferential groove which is to contact the road prior to the axially narrowed portion during forward direction, not only the silencing effect of the tire noise can be exhibited but also the formation of the vortex of the fluid in the circumferential groove can be prevented during when the tire rotates and contacts the road. As a result, the present invention has the merits that while the wet performance can be maintained, the noise of the tire can be reduced.

What is claimed is:

1. A pneumatic tire having a specified forward running direction defined by its tread pattern comprising; a pair of sidewalls, and a tread toroidally between both the sidewalls and adapted to contact a road, said tread being provided with a tread pattern having at least one circumferential groove extending in parallel to an equatorial plane of the tire, a plurality of central lug grooves intersecting said at least one circumferential groove, and central lugs defined by the at least one circumferential groove and said central lug grooves intersecting the former groove, wherein axially narrow portions and axially wide portions are periodically formed for said at least one circumferential groove by waving at least one of opposite side walls of at least one circumferential groove in an axial direction, and each of said central lug grooves is combined with said at least one circumferential groove at an area located between an axially most narrowed portion of the circumferential groove and an axially most widened portion of the circumferential groove which area contacts the road at a point in time prior to contact of said axially most narrowed portion while said tire is rotating in said specified forward running direction.

2. The pneumatic tire of claim 1, wherein a pair of shoulder-circumferential grooves are provided on the tread, a number of shoulder-lug grooves, being provided on the tread near opposite edges thereof, the shoulder-lug grooves being each bent in a reversely dog-leg form and extending between each of the edges of a respective tread and the shoulder-circumferential groove, and the central lugs are circumferentially staggered from the shoulder-lug grooves in phase.

3. The pneumatic tire of claim 1, wherein said at least one of the sidewalls of the circumferential groove is axially waved in a sinusoidally curved form or in a polygonally curved form.

4. The pneumatic tire of claim 1, wherein a vertex of a ridge is located inside a pitch area defined between adjacent valleys of said at least one of the sidewalls of the circumferential groove, provided that a portion falling 20% of the pitch area as measured from each of the valleys and the adjacent valley is excluded.

5. The pneumatic tire of claim 3, wherein each of the central lug grooves is combined with such a portion of the circumferential groove on the sinusoidal curved sidewall that a tangential line drawn at this portion of the circumferential groove between valleys and a vertex of the ridge succeedingly contacting a road forms an angle of 4° to 30° between the equatorial plane C.

6. The pneumatic tire of claim 2, wherein a width of the central lug groove is widest at a location where the central lug groove is combined with the shoulder-circumferential groove, the depth of the central lug groove is smaller than that of the shoulder-circumferential groove.

7. The pneumatic tire of claim 1, wherein a width of the central lug groove gradually decreases toward the central circumferential groove, a depth of the lug groove increases to compensate reduction in the width thereof, and the depth of the central lug groove becomes substantially equal to that of the circumferential groove at the location where the central lug groove is combined with the circumferential groove.

8. The pneumatic tire of claim 1, wherein an axially inner side of said circumferential groove of said tire when mounted is shaped in a sinusoidal form.

9. The pneumatic tire of claim 1, wherein the ratio of $W_1/W_0$ in which $W_0$ and $W_1$ are widths of the circumferential groove at the valleys and a vertex of a ridge, respectively, is 0.2 to 0.9.

10. The pneumatic tire of claim 1, wherein the ratio of $W_1/W_0$ in which $W_0$ and $W_1$ are widths of the circumferential groove at valleys and a vertex of a ridge, respectively, is 0.3 to 0.8.

11. The pneumatic tire of claim 1, wherein said circumferential groove is an axially central circumferential groove.

12. The pneumatic tire of claim 11, wherein both sidewalls of said axially central circumferential groove are waved.

* * * * *